United States Patent Office 3,113,937
Patented Dec. 10, 1963

3,113,937
DISAZO-DYESTUFFS INSOLUBLE IN WATER
Herbert Nakaten, Bad Soden, Taunus, and Joachim Ribka, Offenbach (Main), Germany, assignors to Farbwerke Hoechst Aktiengesellschaft vormals Meister Lucius & Brüning, Frankfurt am Main, Germany, a corporation of Germany
No Drawing. Filed July 19, 1960, Ser. No. 43,729
Claims priority, application Germany July 28, 1959
6 Claims. (Cl. 260—178)

The present invention relates to new disazo-dyestuffs insoluble in water, more particularly it relates to dyestuffs which correspond to the following general formula

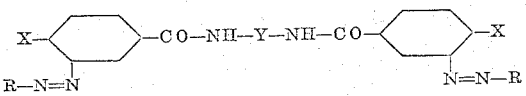

in which X represents hydrogen, a halogen atom, an alkyl or alkoxy group, Y represents a radical of the benzene or diphenyl series and R stands for a radical of 2-hydroxynaphthalene-3-carboxylic acid, 2-hydroxynaphthalene-3-carboxylic acid amide or 2-hydroxynaphthalene-3-carboxylic acid arylamide.

We have found that valuable disazo-dyestuffs insoluble in water are obtained by coupling a tetrazonium compound from an amine of the general formula

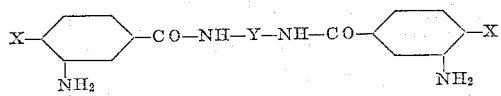

in which X represents hydrogen, a halogen atom, an alkyl or alkoxy group and Y represents a radical of the benzene or diphenyl series, with 2-hydroxynaphthalene-3-carboxylic acid, 2-hydroxynaphthalene-3-carboxylic acid amide or a 2-hydroxynaphthalene-3-carboxylic acid-arylamide.

The diamino compounds used in the present invention can be prepared by known methods, for example, by condensing 3-nitro-benzoic acid, 3-nitro-benzoic acid halides or their derivatives substituted in the 4-position, with 1,4-diamino-benzenes or 4,4'-diamino-diphenyls and subsequently reducing the nitro compounds so obtained. In addition to 3-nitro-benzoic acid, for example 3-nitro-4-chloro-benzoic acid, 3-nitro-4-methoxy-benzoic acid or 3-nitro-4-methyl-benzoic acid can also be used for the condensation with the diamines. As diamines there can be used, for example, 1,4-diamino-benzene, 4,4'-diaminodiphenyl, 4,4'-diamino - 3,3' - dimethoxydiphenyl, 4,4'-diamino-3,3'-dimethyldiphenyl or 4,4'-diamino-3,3'-dichlorodiphenyl.

As coupling components there can be used in the present invention 2-hydroxynaphthalene-3-carboxylic acid, 2-hydroxy-naphthalene-3-carboxylic acid amide, 2-hydroxy-naphthalene-3-carboxylic acid phenylamide and its derivatives substituted in the phenyl radical by halogen atoms, alkyl or alkoxy groups, furthermore 2-hydroxynaphthalene-3-carboxylic acid naphthylamides which are free from groups imparting solubility in water, such as, for instance, carboxylic acid or sulfonic acid groups.

The dyestuffs are prepared by known methods, for example, by coupling the tetrazotized diamines with the coupling components in an aqueous solution in the presence of a dispersing agent.

The new dyestuffs are water-insoluble pigments which are distinguished by a very good fastness to solvents. They are especially suitable for coloring lacquers and thermoplastic masses and also for pigment printing.

The following examples serve to illustrate the invention but they are not intended to limit it thereto, the parts being by weight unless otherwise stated and the relationship of parts by weight to parts by volume being the same as that of the kilogram to the liter.

Example 1

41.5 parts of 1,4-di-(3'-amino-4'-chlorobenzoylamino)-benzene are stirred into 500 parts by volume of glacial acetic acid and 120 parts by volume of 5 N-hydrochloric acid and the whole is tetrazotized by adding 40 parts by volume of a 5 N-sodium nitrite solution. The tetrazo solution so obtained is diluted with water to 4000 parts by volume, clarified and combined with an aqueous suspension of 60 parts of 1-(2',3'-hydroxynaphthoylamino)-2-methoxybenzene that had been prepared by dissolving this compound in diluted sodium hydroxide solution and reprecipitating it with glacial acetic acid in the presence of a reaction product of about 20 mols of ethylene oxide with 1 mol of octodecyl alcohol.

When the coupling is complete, the separated dyestuff is filtered off with suction, washed and dried. It is an orange powder. The dyestuff corresponds with the following formula

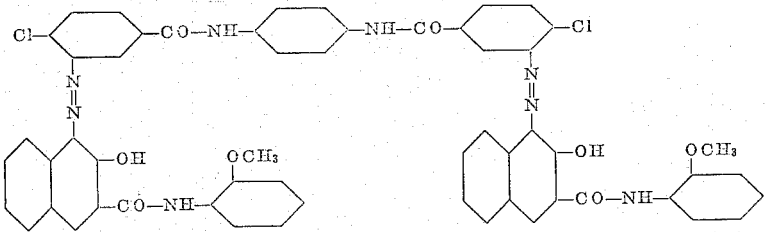

Nitro cellulose lacquers prepared with the dyestuff give a red lacquering which possesses a very good fastness to overspraying. When incorporated into polyvinylchloride a red coloration of very good fastness to bleeding is obtained.

Example 2

8.65 parts of 1,4-di-(3'-amino-benzoylamino)-benzene are stirred for several hours in 30 parts by volume of 5 N-hydrochloric acid and 30 parts by volume of water, the whole is diluted with water and tetrazotized at room temperature with 10 parts by volume of a 5 N-sodium nitrite solution.

As described in Example 1, the clarified tetrazo solution is combined with an aqueous suspension of 15 parts of 1-(2',3'-hydroxynaphthoylamino)-2 - methoxybenzene. When the coupling is complete, the separated dyestuff is filtered off with suction, washed and dried. It is a yellowish red powder.

The following table comprises a number of further dyestuffs that can be obtained by the present invention, and also their tints:

| Diazo component | Coupling component | Tint |
| --- | --- | --- |
| 1,4-di-(3'-amino-benzoylamino)-benzene. | 1-(2',3'-hydroxynaphthoylamino)-2,4-dimethoxy-5-chlorobenzene. | red. |
| 1,4-di-(3'-amino-4'-chlorobenzoylamino)-benzene. | do | carmine. |
| Do | 1-(2',3'-hydroxynaphthoylamino)-4-methoxybenzene. | red. |
| Do | 1-(2',3'-hydroxynaphthoylamino)-2-ethoxybenzene. | orange. |
| Do | 1-(2',3'-hydroxynaphthoylamino)-2,4-dimethoxy-5-chlorobenzene. | red. |
| Do | 2-hydroxynaphthalene-3-carboxylic acid. | red. |
| Do | 2-hydroxynaphthalene-3-carboxylic acid amide. | orange. |
| 1,4-di-(3'-amino-4'-methoxybenzoylamino)-benzene. | 1-(2',3'-hydroxynaphthoylamino)-2,5-dimethoxy-4-chlorobenzene. | carmine. |
| Do | 1-(2',3'-hydroxynaphthoylamino)-2,4-dimethoxy-5-chlorobenzene. | claret. |
| Do | 1-(2',3'-hydroxynaphthoylamino)-4-methoxybenzene. | carmine. |
| 1,4-di-(3'-amino-4'-methylbenzoylamino)-benzene. | 1-(2',3'-hydroxynaphthoylamino)-2,5-dimethoxy-4-chlorobenzene. | Do. |
| Do | 1-(2',3'-hydroxynaphthoylamino)-2,4-dimethoxy-5-chlorobenzene. | Do. |
| Do | 1-(2',3'-hydroxynaphthoylamino)-2-methoxybenzene. | red. |
| 4,4'-di-(3''-amino-4''-chlorobenzoylamino)-3,3'-dimethoxydiphenyl. | do | red. |
| 4,4'-di-(3''-amino-4''-methoxybenzoylamino)-3,3'-dimethyldiphenyl. | 1-(2',3'-hydroxynaphthoylamino)-2,5-dimethoxy-4-chlorobenzene. | carmine. |
| Do | 1-(2',3'-hydroxynaphthoylamino)-2,4-dimethoxy-5-chlorobenzene. | Do. |
| Do | 1-(2',3'-hydroxynaphthoylamino)-2-methylbenzene. | Do. |
| Do | 1-(2',3'-hydroxynaphthoylamino)-2-methyl-5-chlorobenzene. | Do. |
| 4,4'-di-(3''-amino-4''-methylbenzoylamino)-diphenyl. | 1-(2',3'-hydroxynaphthoylamino)-2-methoxybenzene. | red. |
| 4,4'-di-(3''-amino-4''-methoxybenzoylamino)-3,3'-dichlorodiphenyl. | 1-(2',3'-hydroxynaphthoylamino)-4-methoxybenzene. | carmine. |

We claim:
1. Water-insoluble disazo-dyestuffs which correspond to the general formula

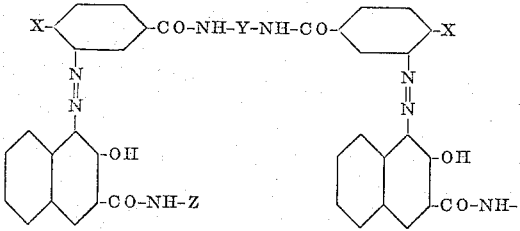

in which X represents a member selected from the group consisting of hydrogen, chlorine, methyl and methoxy, Y represents a member selected from the group consisting of phenylene, diphenylene, dimethyldiphenylene, dimethoxydiphenylene and dichlorodiphenylene, and Z represents a member selected from the group consisting of phenyl, methylphenyl, methoxyphenyl, ethoxyphenyl, methylchlorophenyl and dimethoxychlorophenyl.

2. The water-insoluble disazo-dyestuff which corresponds to the formula

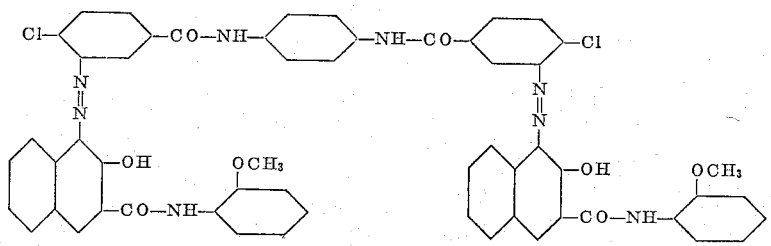

3. The water-insoluble disazo-dyestuff which corresponds to the formula

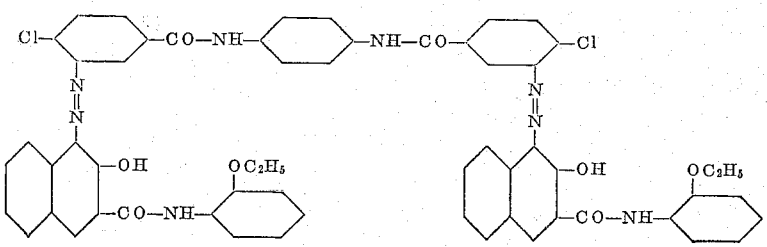

4. The water-insoluble disazo-dyestuff which corresponds to the formula
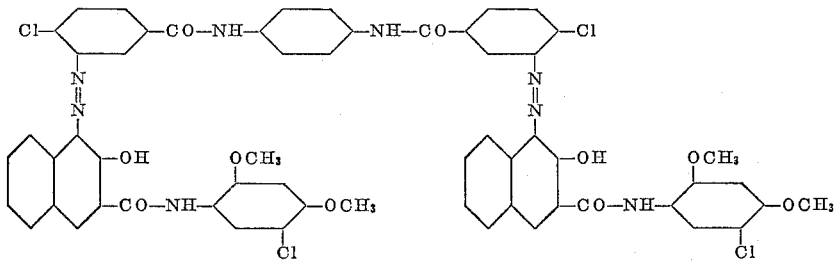
5. The water-insoluble disazo-dyestuff which corresponds to the formula
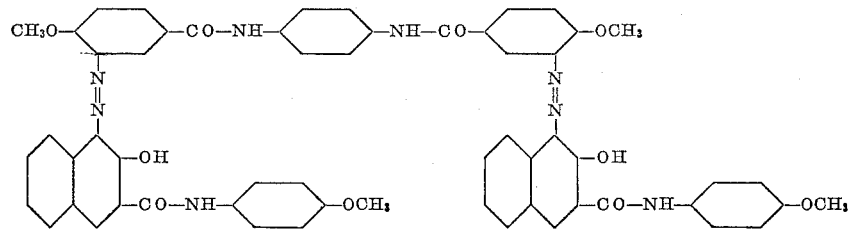
6. The water-insoluble disazo-dyestuff which corresponds to the formula
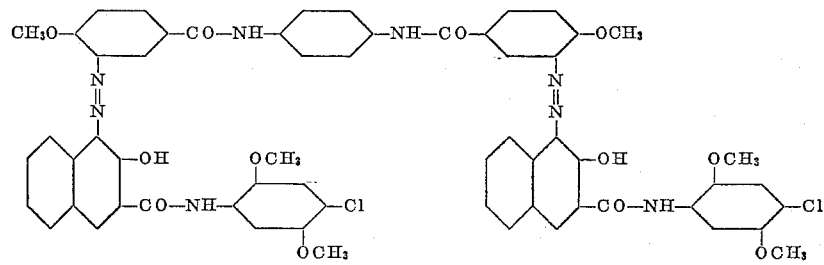
References Cited in the file of this patent
UNITED STATES PATENTS
| | | |
|---|---|---|
| 2,001,526 | Dahlen | May 14, 1935 |
| 2,023,176 | Krzikalla et al. | Dec. 3, 1935 |
| 2,448,853 | Allen et al. | Sept. 7, 1948 |
| 2,714,587 | Neier et al. | Aug. 2, 1955 |
| 2,944,050 | Haubrich et al. | July 5, 1960 |